US011954986B2

(12) United States Patent
Sun et al.

(10) Patent No.: US 11,954,986 B2
(45) Date of Patent: Apr. 9, 2024

(54) SELF-SERVICE APPARATUS WITH THREE-LAYER SYSTEM ARCHITECTURE

(71) Applicant: ELO TOUCH SOLUTIONS, INC., Milpitas, CA (US)

(72) Inventors: Yin Sun, Shanghai (CN); Xueqing Wei, Shanghai (CN); Jinfeng Zhang, Shanghai (CN); Hua Shao, Shanghai (CN)

(73) Assignee: Elo Touch Solutions, Inc., Knoxville, TN (US)

( * ) Notice: Subject to any disclaimer, the term of this patent is extended or adjusted under 35 U.S.C. 154(b) by 132 days.

(21) Appl. No.: 17/599,862

(22) PCT Filed: Apr. 22, 2020

(86) PCT No.: PCT/US2020/029202
§ 371 (c)(1),
(2) Date: Sep. 29, 2021

(87) PCT Pub. No.: WO2020/219481
PCT Pub. Date: Oct. 29, 2020

(65) Prior Publication Data
US 2022/0198869 A1    Jun. 23, 2022

(30) Foreign Application Priority Data
Apr. 25, 2019 (CN) .......................... 201910336390.2

(51) Int. Cl.
*G07F 9/00* (2006.01)
*G05F 1/46* (2006.01)
*G06Q 20/18* (2012.01)

(52) U.S. Cl.
CPC ................ *G07F 9/006* (2013.01); *G05F 1/46* (2013.01)

(58) Field of Classification Search
CPC ............ G07F 9/006; G05F 1/46; G06Q 20/18
(Continued)

(56) References Cited

U.S. PATENT DOCUMENTS 7,194,414 B1    3/2007  Savage et al.
7,837,104 B2 *  11/2010 Lum .................... G07G 1/0018
                                                    235/383
(Continued)

FOREIGN PATENT DOCUMENTS

CN    101968668 A     2/2011
CN    107862810 A     3/2018
WO    2015105869 A1   7/2015

OTHER PUBLICATIONS

International Search Report and Written Opinion for the International Patent Application No. PCT/US2020/29202, dated Jul. 16, 2020, 11 pages.
(Continued)

*Primary Examiner* — Toan C Ly
(74) *Attorney, Agent, or Firm* — Sterne, Kessler, Goldstein & Fox P.L.L.C.

(57) ABSTRACT

A self-service apparatus having a three-layer system architecture includes an application-layer device, an intermediate-layer device, and bottom-layer peripheral devices. The application-layer device is configured to provide a user interface for self-service and control the entire self-service apparatus according to an interaction with the user to provide the user with required self-service, and comprises a first processor and a first memory. The first processor executes an application program stored in the first memory and communicates with the intermediate-layer device. The intermediate-layer device comprises a terminal control module which comprises a second processor and a second memory. The second processor communicates with the bottom-layer peripheral devices, and the second processor
(Continued)

executes a control program stored in the second memory to control operations of the peripheral devices based on an instruction from the application-layer device. The peripheral devices do not communicate with the application-layer device directly.

20 Claims, 4 Drawing Sheets

(58) Field of Classification Search
 USPC .......................................................... 235/375
 See application file for complete search history.

(56) References Cited

U.S. PATENT DOCUMENTS

| | | | |
|---|---|---|---|
| 10,397,013 B1* | 8/2019 | Hill | H04L 12/281 |
| 11,315,092 B1* | 4/2022 | Dennis | G06Q 20/425 |
| 2009/0313026 A1 | 12/2009 | Coffman et al. | |
| 2014/0191034 A1* | 7/2014 | Glanzer | G06K 7/089 |
| | | | 235/449 |
| 2014/0306903 A1 | 10/2014 | Huang et al. | |
| 2015/0347157 A1 | 12/2015 | Cathro et al. | |
| 2017/0201829 A1 | 7/2017 | Kim et al. | |
| 2019/0320515 A1* | 10/2019 | Sadwick | H05B 45/00 |

OTHER PUBLICATIONS

Office Action directed to related Chinese Patent Application No. 201910336390.2, dated Apr. 25, 2022, with attached English-language machine translation; 43 pages.

International Preliminary Report on Patentability directed to related International Patent Application No. PCT/US2020/029202, dated Sep. 28, 2021; 10 pages.

* cited by examiner

SELF-SERVICE APPARATUS WITH THREE-LAYER SYSTEM ARCHITECTURE

This is a national stage application filed under 35 U.S.C. § 371 of pending international application PCT/US2020/029202, filed Apr. 22, 2020, which claims priority to Chinese Patent Application No. CN 201910336390.2, filed Apr. 25, 2019, the entirety of which applications are hereby incorporated by reference herein.

TECHNICAL FIELD

The present disclosure relates to a self-service apparatus, and in particular, to a self-service apparatus with three-layer system architecture.

BACKGROUND

With the widespread of the network and the promotion of electronic payment methods, there have been developed in the retail, catering and other industries many self-service terminals that basically do not need the assistance from the staff but instead may be operated by customers themselves, such as self-service check-out terminals operated by customers for checking out. These self-service apparatuses reduce the expenditures of labor costs while providing convenience for customers and saving customers' time.

In order to provide various self-services, those terminals generally have a variety of peripheral devices for implementing various functions to support operations, and thus it is desirable to effectively control these wide varieties of peripheral devices.

SUMMARY

One of the objects of the present disclosure is to provide a novel self-service apparatus.

According to one aspect of the present disclosure, there is provided a self-service apparatus having a three-layer system architecture, comprising an application layer device, an intermediate layer device, and a plurality of bottom layer peripheral devices. The application layer device is configured to provide a user interface for self-service, and control the entire self-service apparatus according to an interaction with the user so as to provide the user with required self-service, and the application layer device at least comprises a first processor and a first memory, wherein the first processor executes an application program for the self-service that is stored in the first memory and communicates with the intermediate layer device. The intermediate layer device at least comprises a terminal control module, and the terminal control module at least comprises a second processor and a second memory, wherein the second processor communicates with the bottom layer peripheral devices, and the second processor executes a control program that is stored in the second memory so as to control operations of one or more bottom layer peripheral devices based on an instruction from the application layer device. Said plurality of bottom layer peripheral devices do not communicate with the application layer device directly.

According to another aspect of the present disclosure, there is provided an intermediate layer device for being used in a self-service apparatus having a three-layer system architecture, where the self-service apparatus further comprises an application layer device and a plurality of bottom layer peripheral devices that communicate with the intermediate layer device respectively, and the plurality of bottom layer peripheral devices do not communicate with the application layer device directly. The intermediate layer device comprises: a terminal control module including at least a processor and a memory, wherein the processor executes a control program stored in the memory so as to control operations of one or more bottom layer peripheral devices based on an instruction from the application layer device.

Further features of the present disclosure and advantages thereof will become more apparent from the detailed description of the exemplary embodiments of the present invention hereinafter with reference to the accompanying drawings.

BRIEF DESCRIPTION OF THE DRAWINGS

The accompanying drawings, which constitute a part of the specification, describes embodiments of the present disclosure, and together with the description, serve to explain the principles of the disclosure.

The present disclosure can be better understood from the following detailed description with reference to the accompanying drawings, in which.

Note that, in the embodiments described below, in some cases the same portions or portions having similar functions are denoted by the same reference numerals in different drawings, and description of such portions is not repeated. In some cases, similar reference numerals and letters are used to refer to similar items, and thus once an item is defined in one figure, it need not be further discussed for following figures.

In order to facilitate understanding, the position, the size, the range, or the like of each structure illustrated in the drawings and the like are not accurately represented in some cases. Thus, the disclosure is not necessarily limited to the position, size, range, or the like as disclosed in the drawings and the like.

DETAILED DESCRIPTION

Various exemplary embodiments of the present disclosure will be described in detail below with reference to the drawings. It should be noted that the relative arrangement of the components and steps, numerical expressions and numerical values set forth in the embodiments are not intended to limit the scope of the disclosure, unless otherwise specified.

The following description of at least one exemplary embodiment is merely illustrative and by no means to intend as any limitations to the disclosure and its application or uses. That is, the structures and methods herein are illustrated in an exemplary manner to explain various embodiments of the structures and methods in the present disclosure. However, those skilled in the art will understand that they merely explain the exemplary manner, rather than the exhaustive manner, that may be used to embody the disclosure. In addition, the drawings are not necessarily to scale, some features may be exaggerated to show details of specific components.

Techniques, methods and devices known to those of ordinary skill in the relevant art may not be discussed in detail, but where appropriate, the techniques, methods and devices should be considered as part of the authorized specification.

In all of the examples shown and discussed herein, any specific values are to be construed as illustrative only and not as a limitation. Accordingly, other examples of the exemplary embodiments may have different values.

One embodiment of the present disclosure proposes a self-service apparatus having three-layer system architecture, which contains an application layer device, an intermediate layer device, and a plurality of bottom layer peripheral devices. Note that, the three layers in the architecture as discussed herein are divided based on their functionalities and operations, and it is not intended to limit physical locations of the devices in the three layers. For example, in some implementations, some or all of the components of the intermediate layer device may be encapsulated into one apparatus with the application layer device, or may be integrated with a portion of the components of the application layer device onto one PCB. For example, in some implementations, components of some of the bottom layer peripheral devices may be integrated into the intermediate layer device, or encapsulated together.

The above-recited application layer device is configured to provide a user interface for self-service, and to control the entire self-service apparatus so as to provide the user with required self-service according to an interaction with the user. The application layer device includes at least a first processor and a first memory, wherein the first processor executes an application program for self-service stored in the first memory and communicates with the intermediate layer device. The intermediate layer device includes at least a terminal control module, and the terminal control module includes at least a second processor and a second memory, wherein the second processor communicates with the bottom layer device and executes a control program stored in the second memory so as to control operations of one or more bottom layer peripheral devices based on instructions from the application layer device. Please note that the bottom layer peripheral devices do not communicate with the application layer device directly.

In comparison with the prior art, by setting the system of the self-service apparatus to a three-layer architecture and using the Terminal Control Module (TCM) in the intermediate layer to conduct centralized control of the bottom layer peripheral devices, the application layer device only needs to match and communicate with the TCM in the intermediate layer in order to control all peripherals, without knowing the specific configuration of these peripherals. Therefore, the application layer device may realize the control of the entire self-service apparatus more easily. In addition, the self-service apparatus may easily change/upgrade the bottom layer peripherals without changing the complex programs running on the application layer device, such that the maintenance and hardware upgrades of the entire self-service apparatus are easier.

In order to clearly and completely understand the present invention, some specific examples of the present invention will be described in detail below with reference to the accompanying drawings. However, it will be understood by those skilled in the art that many of the details in the drawings are illustrative and not limitative and should not be construed as limiting the present invention.

Figure 1:
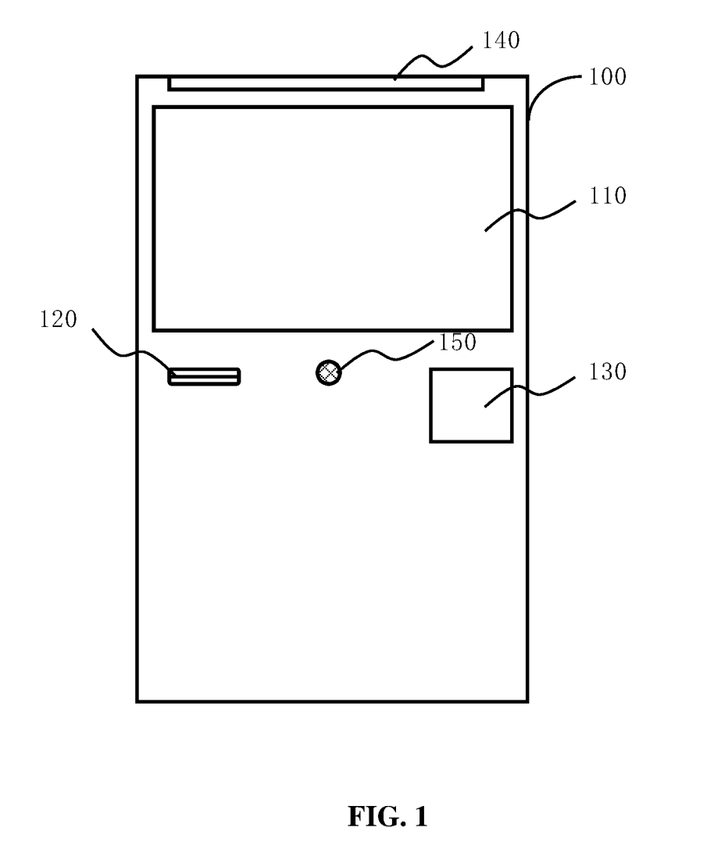
FIG. 1 illustrates a schematic view of the appearance of a self-service apparatus in accordance with one or more exemplary embodiments of the present disclosure.

FIG. 1 illustrates a schematic view of appearance of a self-service apparatus 100 in accordance with an example of the present invention. As shown in FIG. 1, the self-service apparatus 100 is equipped with a touch screen 110, a printer (the paper exit 120 of the printer is shown in the figure), a scanner (the scan window 130 is shown in the figure), a light strip 140, and a microphone 150. Of course, the configuration components of the self-service apparatus 100 are not limited thereto, and may be increased or reduced as needed. For example, the self-service apparatus 100 may further have other components such as a camera, a scale, a bagbox, a speaker, a degaussing device, and the like.

The touch screen 110 may be used to display a user interface for self-services and interact with a user. The self-service apparatus 100 may control operations of the peripheral devices such as the printer, the scanner, the light strip 140, and the microphone 150 according to the interaction, so as to realize the self-service to the user. The printer may be used to print credentials such as shopping receipts and the like. The scanner may be used to scan and read various identification marks such as various QR codes and barcodes. The light strip 140 may indicate the state of the self-service apparatus 100 by using its illuminated color and illuminating mode, wherein the illuminating mode may include a blink mode, a breathing mode, and/or a constant-on mode. For example, in the event that an error occurs when the customer conducts self-service and staff's assistance is required, the light strip 140 may be set to the blink mode and/or set to be red so as to attract the attention of the staff more quickly, to shorten the customer's waiting time. While the self-service apparatus 100 is in an idle state, the light strip 140 may be set to the breathing mode so that the customer can discover an available self-service apparatus more quickly. The microphone 150 may capture the user's voice input for voice control or other operations.

The self-service apparatus 100 as shown in FIG. 1 may be used for various purposes (e.g., self-checkout, self-note-printing, self-registration, self-consulting, etc.) in various industries (e.g., retail, catering, hotel, medical, entertainment, or transportation industries). Common examples include bank automatic teller machines, self-checkout machines in supermarket, self-service ticket machines, and so on. Of course, the application of the self-service apparatus 100 is not limited thereto, but may be used for various self-service occasions that do not require the operation of any staff, and its equipped peripheral devices may also be changed depending on the application occasion.

Figure 2:
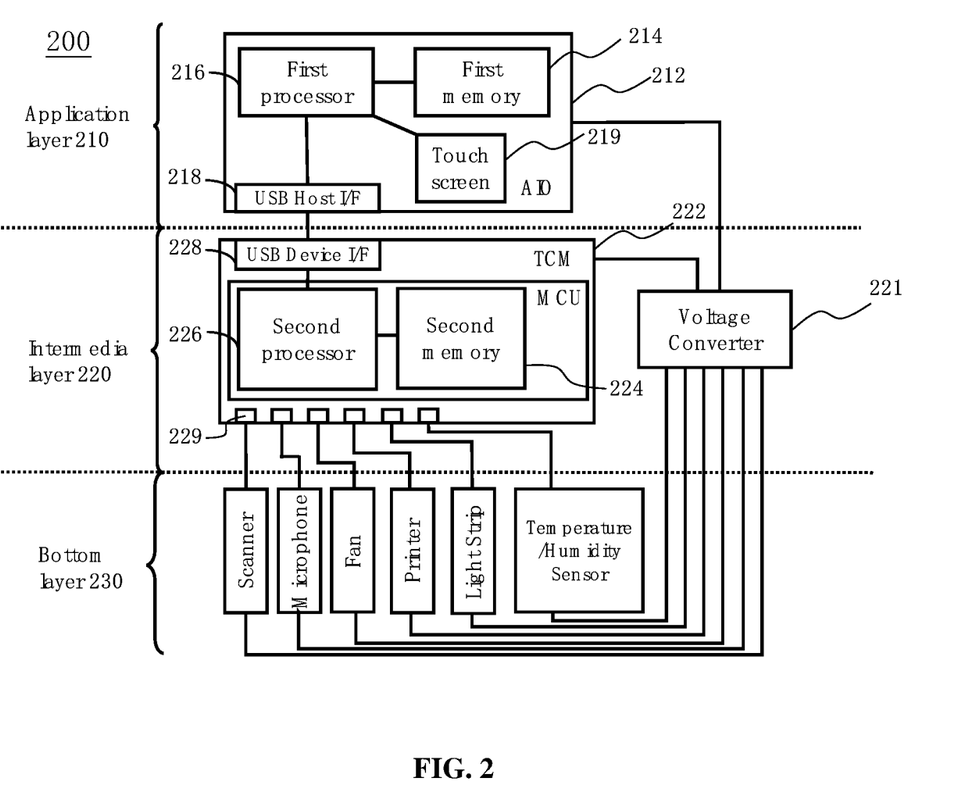
FIG. 2 illustrates a configuration block diagram of a self-service apparatus having three-layer system architecture in accordance with an example of the present disclosure.

FIG. 2 illustrates a configuration block diagram of a three-layer system architecture of a self-service apparatus 200 in accordance with an example of the present disclosure.

As shown in FIG. 2, the self-service apparatus 200 is divided into a three-layer system architecture consisting of an application layer device 210, an intermediate layer device 220, and a bottom layer device 230.

The application layer device 210 is configured to include at least a first processor 216, a first memory 214, and a first I/O interface 218, wherein the first processor 216 executes an application program for self-service stored in the first memory 214, and communicates with the intermediate layer device through the first I/O interface 218. As shown in FIG. 2, the application layer device 210 may further include a touch screen 219. The first processor may be a CPU, and the first I/O interface may be a USB HOST interface. The application layer device 210 may be an All-In-One machine (AIO) integrated with at least a CPU, a memory, a touch screen, and a USB HOST interface.

The AIO 212 may provide a user interface for self-service (e.g., displayed on the touch screen 219) and control the entire self-service apparatus 200 according to user interaction from the touch screen 219 and/or the bottom layer peripheral device, so as to provide the user with desired self-service. For example, the user interface may be a menu interface for a self-food-ordering apparatus, a cashier system interface for self-checkout, and the like.

The intermediate layer device 220 includes a terminal control module (TCM) 222, and the terminal control module 222 includes at least a second processor 226, a second memory 224, a second I/O interface 228 connected to the first I/O interface 218, and a plurality of third I/O interfaces 229 in communication with the bottom layer peripheral devices. As shown in FIG. 2, the second I/O interface 228 may be a USB DEVICE interface. Additionally, in some implementations, the intermediate layer device 220 may also include a voltage converter 221. For example, in some examples, the voltage converter 221 may include a DC voltage conversion chip and an adjustable voltage divider, wherein the DC voltage conversion chip has a voltage output terminal and a voltage sensing terminal, and adjusts the magnitude of the output voltage according to the magnitude of the sensing voltage received at the voltage sensing terminal. The adjustable voltage divider has a high level terminal and a low level terminal which are connected to the voltage output terminal and the ground respectively, and the adjustable voltage divider also has an adjustable voltage terminal which is connected to the voltage sensing terminal, so as to change the magnitude of the sensing voltage and further change the magnitude of the output voltage, by adjusting the voltage division ratio of the adjustable voltage divider. In some cases, the DC voltage conversion chip may be a power management chip and the adjustable voltage divider may be a digital potentiometer. A specific implementation of the voltage converter 221 will be described later with reference to FIG. 4, but those skilled in the art will appreciate that the present invention is not limited to the specific example shown in FIG. 4.

The second processor 226 in the TCM 222 executes a control program stored in the second memory 224, so as to control operations of one or more bottom layer peripheral devices belonging to the bottom layer 230, based on instructions from the AIO 212 of the application layer 210. As shown, the bottom layer peripheral devices do not communicate with the application layer device directly. By controlling operations of the bottom layer devices through the intermediate layer device, the application layer device only needs to match and communicate with the intermediate layer, in order to control the entire self-service apparatus, without need to know various configuration parameters, communication protocols and the like of the bottom layer devices.

As shown in FIG. 2, the second processor 226 and the second memory 224 in the TCM 222 may be integrated into one MCU. The control program stored in the second memory 224 of the TCM 222 is firmware. Controlling the peripheral device by the intermediate layer through firmware consumes significantly less time, and improves the system efficiency as well as the user experience, compared to controlling the peripheral device by the application layer through the operating system.

In addition, the third I/O interface 229 may include, depending on actual needs, one or more of a USB Host interface, an I2C interface, a UART interface, an SPI interface, a GPIO interface, a button interface, a microphone (MIC) interface, a LINE IN interface, a LINE OUT interface and a network port etc. Of course, the type and number of the third I/O interface are not limited thereto, but may be any I/O interface set depending on actual needs.

The bottom layer peripheral devices 230 may include a scanner, a microphone, a camera, a temperature/humidity sensor, a fan, a keyboard, a switch, a button, a scale, a bagbox, a speaker, a printer, a light strip, a degaussing device, an infrared sensor, and the like. The keyboard, the switch, the button, etc. may be used to accept users' input. The scale may be used to determine the weight of the product. The degaussing device may be used to deactivate the tag on the product. The infrared sensor may be used to sense that someone is approaching to the self-service apparatus. The bagbox may be used to provide bags (e.g. plastic bags) automatically. Of course, the bottom layer peripheral device 230 is not limited thereto, but may be any peripheral device required for the self-service apparatus.

In some implementations, in the case that the bottom layer peripheral devices 230 in the self-service apparatus 200 include a temperature sensor and a fan, the TCM 222 may be configured to obtain temperature information from the temperature sensor through the third I/O interface 229, generate a control signal based on the temperature information and transmit the control signal to the fan through another third I/O interface 229 so as to control the operation of the fan. In this way, the temperature inside the self-service apparatus body may be controlled in timely manner to prevent crash and the like due to overheating.

In some implementations, based on the instruction of the application layer 210 or based on the instruction of the intermediate layer device 220 itself, the TCM 222 may directly transmit a control signal to the light strip to control ON/OFF states or colors of the individual illuminating units (e.g., LEDs, etc.) of the light strip, thereby realizing a variety of illuminating modes. In addition, a processing unit (e.g., an MCU) may be included in a more complex light strip, in which case the processing unit of the light strip may communicate with the TCM 222 and may individually control each of the illuminating units of the light strip according to the control signal from the TCM 222.

In other implementations, the bottom layer peripheral device 230 may be indirectly controlled by the TCM 222 in conjunction with other devices (e.g., the voltage converter 221) of the intermediate layer, in addition to being directly controlled by the TCM 222. For example, the light strip may also be indirectly controlled by the TCM 222 via the voltage converter 221. Specifically, the TCM 222 transmits a control signal to the voltage converter 221 so as to control the voltage output by the voltage converter 221 to the light strip. Due to the difference in voltages input to the individual illuminating units, the light strip may exhibit various colors and illuminating modes. Please be noted that, in this case, since the TCM 222 does not need to directly control the light strip, the connection line between the I/O interface 229 and the light strip as shown in FIG. 2 may be omitted, and the processing unit does not need to be included in the light strip. Additionally, the fan may also be indirectly controlled by the TCM 222 via the voltage converter 221. For example, the TCM 222 may transmit to the voltage converter 221 a control signal for controlling the voltage output by the voltage converter 221 to the fan, so as to control the operation of the fan. Note that, in this case, since the TCM 222 does not need to directly control the fan, the connection line between the I/O interface 229 and the fan as shown in FIG. 2 may be omitted.

In some implementations, a user may control the self-service apparatus 200 through interactions with the touch screen 219 and/or the bottom layer peripheral device 230 while the user is using the self-service apparatus 200. For example, in the case where the self-service apparatus 200 is a self-checkout apparatus located in a supermarket, the user may show a bar code or other identification code of the item to be purchased within the scanning range of a scanner that is one of the peripheral devices 230, and then the scanner sends the identified data to the TCM 222 via the third I/O interface 229. The MCU 226 in the TCM 222 then sends the original data or processed data to the application layer AIO 212 via the second I/O interface 228 (e.g., a USB device interface). Next, the AIO 212 processes the data and obtains the item information associated therewith, and displays the item information on the touch screen 219 for the user to confirm whether the item is the item to be purchased by the user. After confirmation, the user may operate on the touch screen 219 to perform the checkout process. In the checkout process, the user may present their payment code to the scanner. The scanner then sends the identified data to the TCM 222 via the third I/O interface 229. The MCU of the TCM 222 may send the original data or processed data to the application layer AIO 212 through the second I/O interface 228. The AIO 212 processes the data and obtains payment information associated therewith and communicates with a remote payment server so as to complete the payment transaction. The AIO 212 may then determine whether to send an instruction for printing receipt to the TCM 222 based on the completion of the transaction and/or the user's choice (e.g., displaying on the touch screen whether printed paper receipt is needed). In the case where printing is needed, the TCM 222, upon receiving an instruction from the AIO 212, converts it to an instruction applicable for the printer as one of the bottom layer peripheral devices 230, and sends it to the printer, so that the customer may obtain a receipt corresponding to the transaction. It should be understood by those skilled in the art that the above operations of processing data and obtaining information associated therewith are not limited to be performed in the AIO of the application layer, but can also be performed in the TCM 222 of the intermediate layer or in the remote server in communication with the TCM 222 or the AIO 212.

In some implementations, as shown in FIG. 2, the bottom layer peripheral devices 230 of the self-service apparatus 200 may include multiple audio input devices (e.g., a separate microphone, a microphone array, an audio line-in device, etc.). Accordingly, the third I/O interface 229 in the TCM 222 of the self-service apparatus 200 may also include multiple audio input interfaces (e.g., a microphone (MIC) interface connected to a microphone, a LINE IN interface, etc.). In addition, the bottom layer peripheral devices 230 may further include a speaker connected to a LINE OUT interface which is one of the third I/O interfaces 229. The self-service apparatus 200 may capture the user's voice by using a microphone/microphone array, and/or receive audio input from the outside by using an audio line-in device. These received voice and/or audio may be played by the speaker and/or transmitted to the application layer device 210. For example, in some cases, the TCM 222 may receive the user's voice from the microphone array and output it separately to the application layer device 210 for semantic analysis, so as to realize voice control. In addition, in some cases, the self-service apparatus 200 may also need to play audio from the application layer device 210 and/or audio stored in the intermediate layer device 220 by using a speaker.

Thus, the TCM 222 may receive the first audio signal from the application layer device 210, receive the second audio signal from the microphone or microphone array, receive the third audio signal from the audio line-in device, and/or store the fourth audio signal in the second memory 224, and may output any one of the first, second, third, and fourth audio signals separately to the application layer device 210 and/or the speaker, and/or synthesize and output any two or more of the first, second, third, and fourth audio signals to the speaker. For example, any two or more of the first, second, third, and fourth audio signals may be synthesized into a stereo audio and then output to the speaker.

Figure 3:
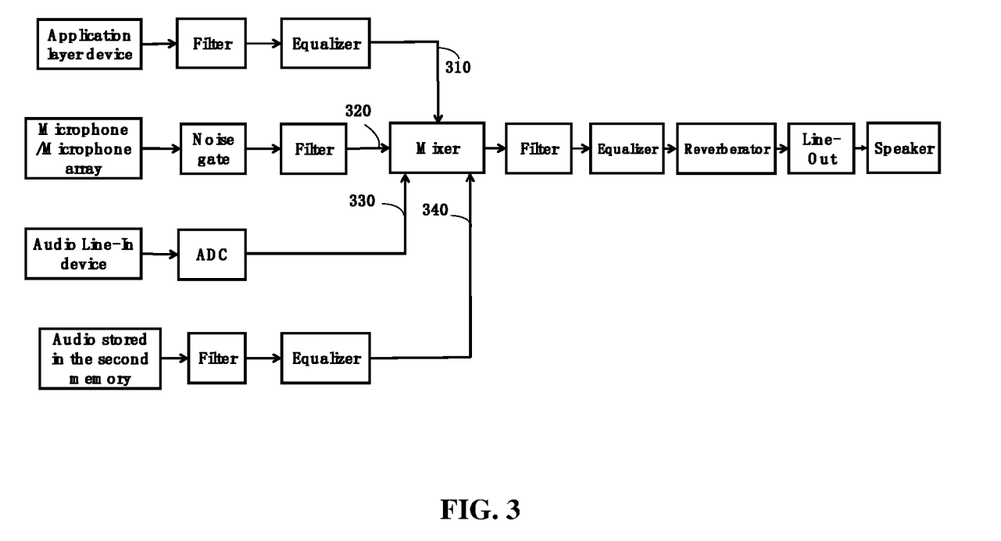
FIG. 3 illustrates a schematic diagram of synthesizing audio signals in accordance with one or more exemplary embodiments of the present disclosure.

Some details of synthesizing the audio signals will be described in detail below in conjunction with FIG. 3. Those skilled in the art will understand that these details are merely illustrative and not limitative. FIG. 3 illustrates a schematic diagram of synthesizing audio signals in a self-service apparatus in accordance with one or more examples of the present disclosure. The synthesis of audio signals (operations of a mixer) as shown in FIG. 3 is performed in the intermediate layer TCM 222.

Four audio input signals 310-340 that the TCM 222 may receive and synthesize are shown in FIG. 3. Specifically, the TCM 222 may be configured to receive, from an application layer device 210, via a second I/O interface 228, a first audio signal 310 which is filtered by a filter and passed through an equalizer to adjust magnitudes of various frequency components of the signal. The TCM 222 may also receive, from a microphone or microphone array, via a microphone interface, a second audio signal 320 which was subjected to noise gate processing such that, for example, ambient noise is reduced, and filtered by a filter. The TCM 222 may also receive, from an audio line-in device, via a line-in interface, a third audio signal 330 which was subjected to analog to digital conversion (ADC) so as to become a digital signal. The various above-recited processes of the three audio signals may be performed in the corresponding application layer device/bottom layer peripheral device or TCM according to actual conditions. In addition, the fourth audio signal 340 stored in the second memory of the TCM 222 may be subjected to filtering by a filter and subsequent equalization processing by an equalizer.

The mixer in TCM 222 receives first, second, third and fourth audio signals 310-340 and synthesizes them into a synthesized audio signal which then subjects to processing by a filter, an equalizer and a reverberator, and then be output to the speaker through the line-out interface. In some implementations, the line-out interface may be a left/right two-channel output interface, and the synthesized audio signal may be a stereo audio.

It should be understood by those skilled in the art that although the synthesis of four audio signals is illustrated in FIG. 3, the present application is not limited thereto, and more audio signals may be received and synthesized, or only any two or three of the four audio signals may be synthesized, based on actual needs. In addition, note that the various processes shown in FIG. 3 for audio signals are all illustrative but not limitative, and are not intended to be necessary to the present invention, but may be selected or changed according to actual applications.

In some implementations, for example, the above-mentioned first audio signal 310 may include a self-service prompt audio (e.g., prompting the customer to "watch the camera" when photographing is required to verify the customer's identity, prompting the customer "please present the payment code" when the payment is required, etc.). The fourth audio signal 340 may include an audio customized by the merchant (e.g., hardware/firmware/peripheral devices' error message, merchant-customized brand specific audio, etc.), and the like. In practical operation, there is a case where the application layer device of the self-service apparatus issues a self-service prompt audio, and the intermediate layer device issues a possible error message audio, while the customer is operating the self-service apparatus by voice instructions. In this case, the TCM 222 may perform the audio signal synthesis shown in FIG. 3, so as to ensure that the customer will not miss the voice prompt audio from the application layer device and/or the error message audio from the second memory of the intermediate layer TCM 222, while his/her own voice instructions input via the microphone can also be heard. In addition, by performing the audio synthesis and the output of the synthesized audio by the TCM 222, the processing time thereof is significantly shortened and the user experience is improved, compared to performing similar processing by using the application layer system.

It will be understood by those skilled in the art that although the foregoing FIG. 2 illustrates that the application layer 210 is an AIO and is separated from the intermediate layer 220, the present invention is not limited thereto. For example, some or all of the intermediate layer modules may also be arranged in the AIO which is used as the application layer, such as on the same PCB board. Similarly, in some cases, some or all of the components of the bottom layer peripheral devices may also be arranged with the intermediate layer device together, such as on the same PCB. Herein, it is intended that, the three layers of the architecture are divided by functionality, without limiting their spatial locations, so even if one intermediate layer module is integrated into the AIO, it will still belong to the intermediate layer. Therefore, in some arrangements, the I/O interfaces shown in the figures are not necessary and are not intended to limit the present invention.

In addition, those skilled in the art can understand that although the foregoing FIG. 2 illustrates that the second processor and the second memory are integrated in one MCU in the intermediate layer 220, the present invention is not limited thereto, for example, the second memory may also be arranged outside the MCU. The second processor and/or the second memory may be part of the MCU, e.g. both may be integrated in the MCU, or designed separately.

A voltage converter in accordance with one embodiment of the present invention, which is used in a self-service apparatus to provide respective components therein with respective required voltages, will be described in detail below with reference to FIG. 4. The voltage converter is configured to convert a voltage input from an external power supply into multiple DC voltage outputs, so as to provide different operating voltages required by different components. In addition, the voltage converter is configured to adjust the ON/OFF state and/or magnitude of each of the output DC voltages in accordance with control signals from the outside and/or control signals generated by itself. For example, in the self-service apparatus shown in FIG. 2, the voltage converter may be part of the intermediate layer device and connected to the TCM, and then the voltage converter may adjust the ON/OFF state and/or magnitude of each of the output DC voltages in accordance with control signals from the TCM. However, those skilled in the art understand that the voltage converter according to the present invention is not limited to being used in the intermediate layer in the foregoing three-layer architecture as shown in FIG. 2, but may be used in other suitable structures as needed, as long as different required operating voltages can be provided for different components.

Figure 4:
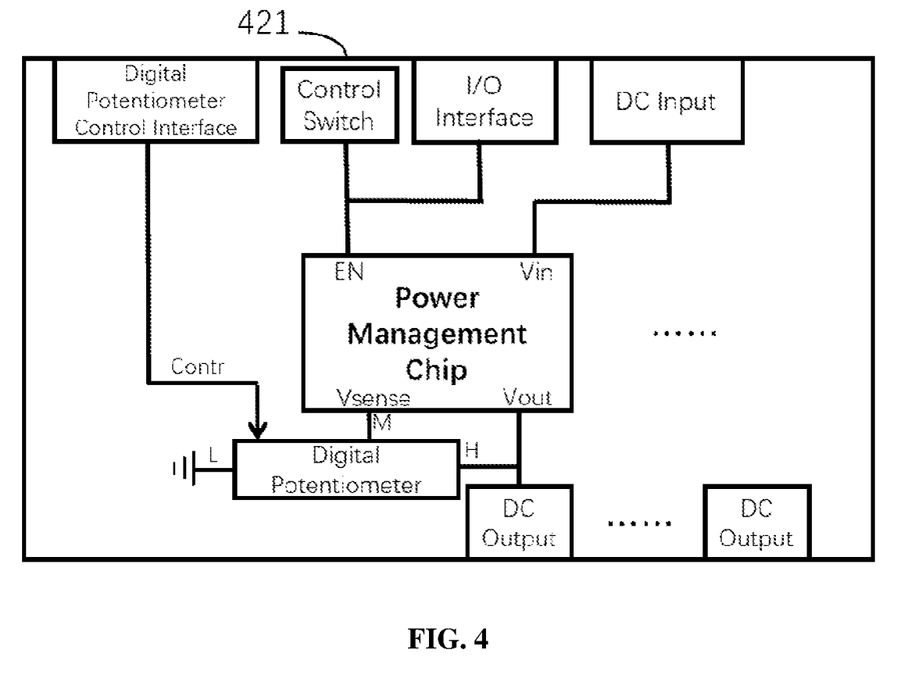
FIG. 4 illustrates a configuration block diagram of a voltage converter of a self-service apparatus according to an example of the present disclosure.

FIG. 4 illustrates a configuration block diagram of a voltage converter 421 according to one specific example of the present disclosure.

As shown in FIG. 4, the voltage converter 421 receives a DC input voltage from the outside through a direct current (DC) input interface, converts the DC input voltage into multiple controllable output voltages through components such as a power management chip and a digital potentiometer etc., and outputs them through multiple corresponding DC output interfaces respectively. Note that, only the specific conversion circuit corresponding to one controllable output voltage is shown in FIG. 4, and the same conversion circuit may be used for the remaining output voltages, therefore the repeated description will be omitted in the drawings and hereinafter.

As shown in FIG. 4, the power management chip has an voltage input terminal Vin, an voltage output terminal Vout, a voltage sensing terminal Vsense, and an enabling terminal EN. The voltage input terminal Vin is connected to the DC input interface to receive a DC input voltage. The enabling terminal EN is used to receive an enabling signal to control the activation or deactivation of the power management chip. In some implementations, the enabling terminal EN is connected to a control switch and an I/O interface for providing the enabling signal. The control switch or the I/O interface may provide the enabling signal independently from each other, but in some cases, the enabling signal provided by the control switch may have a higher priority than the enabling signal provided by the I/O interface. In some implementations, the control switch may be a DIP switch disposed on the board. In some implementations, the I/O interface may communicate with the TCM to receive the enabling signal from the TCM.

The voltage output terminal Vout is used to output the converted voltage, and the voltage sensing terminal Vsense is used to receive the sensing voltage. The power management chip may adjust the magnitude of the output voltage according to the magnitude of the sensing voltage. In some implementations, for example, the power management chip may include a pulse width modulation (PWM) type switching circuit for DC voltage conversion, and may include an error amplifier for comparing the sensing voltage and the internal reference voltage so as to adjust the magnitude of output voltage according to the comparison result.

The digital potentiometer is used as a voltage divider whose high level terminal H and low level terminal L are connected to the voltage output terminal Vout and ground (GND) respectively, and its adjustable intermediate terminal M is connected to the voltage sensing terminal Vsense. Thereby it is able to change the magnitude of the sensing voltage by adjusting the voltage division ratio of the digital potentiometer, so as to change the magnitude of the output voltage. The digital potentiometer may receive a digital control signal Contr from the outside (e.g. the TCM), for example, via a digital potentiometer control interface, and adjust the voltage division ratio according to the digital control signal Contr. Specifically, the total resistance value Rt ($=R_{LM}+R_{HM}$) between the high level and low level terminals of the digital potentiometer may be a fixed value, and the $R_{LM}$ and $R_{HM}$ are resistance values between the adjustable intermediate terminal M and the low level terminal L and between the terminal M and the high level terminal H respectively, which may be adjusted by the digital control signal Contr. Therefore, the voltage division ratio of the digital potentiometer is $R_{LM}/Rt$ and the sensing voltage Vsense=Vout*$R_{LM}$/Rt. The voltage division ratio may be set by the digital control signal Contr, which thereby changes the magnitude of the sensing voltage, and in turn changes the magnitude of the output voltage.

Therefore, with the voltage converter according to the present invention as described above, it is possible to collectively provide multiple different DC power supply voltages. In addition, the ON/OFF state and magnitude of each of output voltages may be controlled remotely.

In addition, although not shown in the drawings, the voltage converter 421 may further include a state light, an overload protection component, etc., wherein the state light may indicate whether each line outputs a DC voltage, and the overload protection component can protect the total load current of the voltage converter 421 from exceeding the threshold for example. In addition, although one power management chip is shown to provide only one output voltage, the present invention is not limited thereto, but instead one power management chip may provide multiple output voltages. In this case the one power management chip may have multiple voltage output terminals and multiple corresponding voltage sensing terminals, and as similar to that of FIG. 4, a digital potentiometer may be connected between one of the voltage output terminals, its corresponding voltage sensing terminal, and the ground.

The terms "front", "rear", "top", "bottom", "above", "below", etc. in the specification and claims, if present, are used for descriptive purposes, and not necessarily for describing a constant relative position. It will be understood that such terms are interchangeable, when appropriate, such that the embodiments of the present disclosure described herein, for example, are capable of operating in other orientations than those shown or otherwise described herein.

As used herein, the term "exemplary" means "serving as an example, instance, or illustration" rather than as a "model" to be precisely replicated. Any implementations exemplarily described herein are not necessarily to be construed as preferred or advantageous over other implementations. Furthermore, the present disclosure is not limited by any of the stated or implied theory presented in the above TECHNICAL FIELD, BACKGROUND, SUMMARY or DETAILED DESCRIPTION.

As used herein, the term "substantially" is intended to include any minor variation resulting from design or manufacturing imperfections, device or component tolerances, environmental influences, and/or other factors. The term "substantially" also allows for variation from perfect or ideal situations resulting from parasitic effects, noise, and other practical considerations that may exist in actual implementations.

In addition, the foregoing description may refer to elements or nodes or features that are "connected" or "coupled" together. As used herein, unless explicitly stated otherwise, "connected" means that one element/node/feature is directly connected electrically, mechanically, logically, or otherwise directly to another element/node/feature (or through direct communication). Similarly, unless explicitly stated otherwise, "coupled" means that one element/node/feature may be mechanically, electrically, logically, or otherwise linked to another element/node/feature in a direct or indirect manner, to allow interaction, even if these two features may not be directly connected. That is, the term "coupled" is intended to include both direct and indirect connections of elements or other features, including the connection using one or more intermediate elements.

In addition, the terms "first", "second", and the like may also be used herein for the purpose of reference only, and thus are not intended to be limiting. For example, unless explicitly indicated by the context, the terms "first", "second", and other such numerical words referring to the structure or element do not imply a sequence or order.

It is also to be understood that the term "comprising/including" when used herein, specifies the presence of stated features, integers, steps, operations, units and/or components, but does not exclude the presence or addition of one or more other features, integers, steps, operations, units and/or components and/or combinations thereof.

In the present disclosure, the term "providing" is used broadly to encompass all manners of obtaining an object, thus "providing an object" includes but is not limited to, "purchasing", "preparing/manufacturing", "arranging/setting", "installing/assembling" and/or "ordering" an object, etc.

Those skilled in the art will appreciate that the boundaries between the above operations are merely illustrative. Multiple operations may be combined into a single operation, and a single operation may be distributed among additional operations, and operations may be performed at least partially overlapping in time. Moreover, alternative embodiments may include multiple instances of a particular operation, and the operational sequence may be varied in other various embodiments. However, other modifications, changes, and replacements are also possible. Accordingly, the specification and drawings are to be construed as illustrative rather than limiting.

While some specific embodiments of the present disclosure have been described in detail by way of example, it will be understood by those skilled in the art that the above examples are for illustrative purposes only and are not intended to limit the scope of the disclosure. The various embodiments disclosed herein may be combined in any combination without departing from the spirit and scope of the disclosure. It will further be understood by those skilled in the art that various modifications may be made to the embodiments without departing from the scope and spirit of the disclosure. The scope of the present disclosure is defined by the appended claims.

What is claimed is:

1. A self-service apparatus having a three-layer system architecture, comprising an application layer device, an intermediate layer device, and a plurality of bottom layer peripheral devices, wherein the application layer device is configured to provide a user interface for self-service, and control the entire self-service apparatus according to an interaction with a user to provide the user with required self-service, and the application layer device at least comprises a first processor and a first memory, wherein the first processor executes an application program for the self-service stored in the first memory and communicates with the intermediate layer device, the application layer device further comprises a first I/O interface for communicating with the intermediate layer device;

wherein the intermediate layer device at least comprises a terminal control module, and the terminal control module at least comprises a second processor and a second memory, wherein the second processor communicates with the plurality of bottom layer peripheral devices, and the second processor executes a control program stored in the second memory to control operations of one or more bottom layer peripheral devices based on an instruction from the application layer device, the intermediate layer device further comprises a second I/O interface in connection with the first I/O interface; and wherein said plurality of bottom layer peripheral devices do not communicate with the application layer device directly.

2. The self-service apparatus of claim 1, wherein the intermediate layer device further comprises a voltage converter configured to convert a voltage input from an external power supply into multiple DC voltage outputs to provide required voltages to respective parts in the self-service apparatus respectively, and wherein the voltage converter is further connected to the terminal control module and configured to adjust ON/OFF state and/or magnitude of each of the mutiple DC voltage outputs according to a control signal from the terminal control module.

3. The self-service apparatus of claim 2, wherein the voltage converter comprises a DC voltage conversion chip and an adjustable voltage divider, wherein the DC voltage conversion chip has a voltage output terminal and a voltage sensing terminal, and adjusts a magnitude of the multiple DC voltage outputs according to a magnitude of a sensing voltage received at the voltage sensing terminal, and wherein the adjustable voltage divider has high level and low level terminals which are connected to the voltage output terminal and ground respectively, and the adjustable voltage divider has an adjustable voltage terminal which is connected to the voltage sensing terminal, to change the magnitude of the sensing voltage and further change the magnitude of the multiple DC voltage outputs by adjusting a voltage division ratio of the adjustable voltage divider.

4. The self-service apparatus of claim 3, wherein the DC voltage conversion chip is a power management chip, and the adjustable voltage divider is a digital potentiometer, and wherein the power management chip further has an enabling terminal for receiving an enabling signal, and the digital potentiometer receives a digital control signal from outside and adjusts the voltage division ratio according to the digital control signal.

5. The self-service apparatus of claim 4, wherein the voltage converter further comprises a control switch, and an I/O interface for communicating with the terminal control module, and wherein the control switch and the I/O interface are connected to the enabling terminal of the power management chip to provide the enabling signal for controlling the ON/OFF state of the multiple DC voltage outputs.

6. The self-service apparatus of claim 2, wherein the plurality of bottom layer peripheral devices comprise a light strip for indicating a state, a temperature sensor, and a fan, the light strip comprising a plurality of LED lights, wherein the temperature sensor communicates with the terminal control module, and the light strip and the fan are connected to a first DC voltage that is output by the voltage converter, wherein the terminal control module is configured to transmit a control signal to the voltage converter to control at least an output of the first DC voltage, to control the operation of the fan and/or the illuminated color and illuminating mode of the light strip, the illuminating mode comprising a blink mode, a breathing mode, and/or a constant-on mode, and wherein the control signal for the fan is generated based at least on temperature information obtained by the terminal control module from the temperature sensor.

7. The self-service apparatus of claim 1, wherein the application layer device further comprises a touch screen for providing the user interface, the first processor is a CPU, and the application layer device is an All-In-One machine integrated with at least the CPU, the first memory and the touch screen.

8. The self-service apparatus of claim 1, wherein the second processor and/or the second memory is contained in one MCU, and the control program is a firmware.

9. The self-service apparatus of claim 1, wherein the plurality of bottom layer peripheral devices comprise one or more of a scanner, a microphone/microphone array, an audio line-in device, a camera, a temperature sensor, a humidity sensor, a fan, a keyboard, a switch, a button, a scale, a bagbox, a speaker, a printer, a light strip, a degaussing device and an infrared sensor.

10. The self-service apparatus of claim 9, wherein the plurality of bottom layer peripheral devices comprise one or more of a separate microphone, a microphone array, and an audio line-in device, and a speaker, wherein the terminal control module is configured to receive a first audio signal from the application layer device, receive a second audio signal from the microphone or microphone array, receive a third audio signal from the audio line-in device, and/or store a fourth audio signal in the second memory, and configured to output any one of the first, second, third, and fourth audio signals separately to the application layer device or the speaker, or synthesize and output any two or more of the first, second, third, and fourth audio signals to the speaker.

11. The self-service apparatus of claim 10, wherein the terminal control module is configured to separately output the second audio signal received from the microphone array to the application layer device for semantic analysis, to realize voice control.

12. The self-service apparatus of claim 10, wherein the first audio signal comprises a self-service prompt audio, and the fourth audio signal comprises a merchant-customized audio, and the terminal control module is configured to synthesize any two or more of the first, second, third and fourth audio signals into a stereo audio and output the stereo audio to the speaker.

13. The self-service apparatus of claim 1, wherein the plurality of bottom layer peripheral devices comprise a light strip for indicating a state, the light strip comprising a plurality of LED lights, the terminal control module is configured to send a control signal to the light strip to control illuminated color and illuminating mode of the light strip, and the illuminating mode comprises a blink mode, a breathing mode, and/or a constant-on mode.

14. The self-service apparatus of claim 1, wherein the plurality of bottom layer peripheral devices comprise a light strip with an MCU, the light strip comprising a plurality of LED lights, the MCU of the light strip communicates with the terminal control module, and the terminal control module is configured to send a control signal to the MCU of the light strip, to control each of the plurality of LED lights individually.

15. The self-service apparatus of claim 1, wherein the plurality of bottom layer peripheral devices comprise a temperature sensor and a fan, and the terminal control module is configured to obtain temperature information from the temperature sensor to generate a control signal based on the temperature information and to send the control signal to the fan to control an operation of the fan.

16. The self-service apparatus of claim 1, wherein the self-service comprises one or more of a self-checkout, a self-receipt-printing, a self-registration, and a self-consulting, and the self-service apparatus is used in retail, catering, hotel, medical, entertainment or transportation industries.

17. The self-service apparatus of claim 1, wherein the intermediate layer device further comprises one or more third I/O interfaces for communicating with the plurality of bottom layer peripheral devices.

18. The self-service apparatus of claim 17, wherein the one or more third I/O interface comprise one or more of a USB host interface, an I2C interface, a UART interface, an SPI interface, a GPIO interface, a button interface, a microphone interface, a line-in interface, a line-out interface and a network port.

19. The self-service apparatus of claim 1, wherein the first I/O interface is a USB host interface and the second I/O interface is a USB device interface.

20. An intermediate layer device for being used in a self-service apparatus having a three-layer system architecture, where the self-service apparatus further comprises an application layer device and a plurality of bottom layer peripheral devices that communicate with the intermediate layer device respectively, and the plurality of bottom layer peripheral devices do not communicate with the application layer device directly, the intermediate layer device comprising:
  a terminal control module including at least a processor and a memory, wherein the processor executes a control program stored in the memory to control operations of one or more bottom layer peripheral devices based on an instruction from the application layer device; and
  a second I/O interface in connection with a first I/O interface of the application layer device, for communicating with the application layer device.

* * * * *

UNITED STATES PATENT AND TRADEMARK OFFICE
CERTIFICATE OF CORRECTION

| | | |
|---|---|---|
| PATENT NO. | : 11,954,986 B2 | Page 1 of 1 |
| APPLICATION NO. | : 17/599862 | |
| DATED | : April 9, 2024 | |
| INVENTOR(S) | : Sun et al. | |

It is certified that error appears in the above-identified patent and that said Letters Patent is hereby corrected as shown below:

In the Claims

In Column 13, Claim 2, Line 15, delete "mutiple" and insert -- multiple --, therefor.

Signed and Sealed this
Twenty-first Day of May, 2024

Katherine Kelly Vidal
*Director of the United States Patent and Trademark Office*